3,801,702
SEMICONDUCTING EUROPIUM- AND/OR YTTERBIUM-CONTAINING SULFIDES AND SELENIDES OF PSEUDO-ORTHORHOMBIC CRYSTAL STRUCTURE

Paul C. Donohue, Montclair, Del., assignor to E. I. du Pont de Nemours and Company, Wilmington, Del.
No Drawing. Filed Apr. 30, 1971, Ser. No. 139,181
Int. Cl. C09k 1/12, 1/16
U.S. Cl. 423—263
13 Claims

ABSTRACT OF THE DISCLOSURE

Disclosed herein are europium- and/or ytterbium-containing tetrachalcogenides of pseudo-orthorhombic crystal structure, and a process therefor. Said tetrachalcogenides, useful as semiconductors and as luminophors, have the formula $$MQ_2X_4$$

wherein:

M is selected from at least one of Eu and Yb,
Q is selected from at least one of Al, Ga and In,
X is selected from at least one of S and Se, and with the proviso that when M consists of or includes Yb, then Q is selected from at least one of Al and Ga.

BACKGROUND OF THE INVENTION

1. Field of the invention

This invention relates to novel sufides and selenides that contain europium and/or ytterbium, to a novel process therefor, and to the use of said sulfides and selenides as semiconductors and as luminophors.

2. Description of the prior art

Particular combinations of properties required in semiconductors in specific applications are so demanding that new compositions are continually being sought. This invention is concerned with new, isotypic semiconducting compositions which, in addition, luminesce in the visible region of the spectrum upon irradiation with UV light or sunlight.

Certain tetrasulfide and tetraselenide compositions are known, including some that contain one or more of the metals taught herein. References to some of these compositions are given below. None of these references teaches or suggests any of the particular compositions disclosed herein or the process for making them.

All of the following references concern tetrachalcogen compositions:

(a) R. Eholie, et al., C. R. Acad. Sci., aris, Ser. C, 268, 700 (1969),
(b) H. Hahn, et al., Z. Anorg. Allg. Chem. 263, 177 (1950),
(c) J. Flahaut, Comptes Rendus 233, 1279 (1951) and J. Flahaut, Ann. Chim., Ser. 12, T., 7 682 (1952),
(d) H. Hahn, et al., Z. Anorg. Allg. Chem. 279, 241 (1955),
(e) L. Krausbauer, et al., Physica 31, 113 (1965),
(f) C. K. Jorgensen, et al., J. Chem. Phys. 62, 444 (1965), and
(g) C. Romers, et al., Acta Cryst. 23, 634 (1967).

The combination of luminescence and semiconductivity characteristic of the products of this invention is attributed to the presence of divalent Eu and/or Yb and to the unusual crystal structure resulting from chemical combination of the relatively large and highly ionic divalent Ca, Sr, Ba, Eu and Yb cations and the smaller, more covalent, trivalent Al, Ga, and In cations with sulfur and selenium anions. It is surprising and especially noteworthy that the novel Eu-containing compositions fluoresce in daylight, being activated by visible light, a property usually exhibited only by certain organic compositions.

SUMMARY OF THE INVENTION

1. Product

The novel tetrachalcogenide compositions of this invention are characterized by their isotypic pseudo-orthorhombic crystal structure and formula:

$$Z_{1-y}M_yQ_2X_4$$

wherein:

M is selected from at least one of Eu and Yb,
Z is selected from at least one of Ca, Sr, and Ba,
Q is selected from at least one of Al, Ga, and In,
X is selected from at least one of S and Se, and
y is 0.0001 to 1, with the provisos that:

(1) when Z consists of or includes Ca, then Q is Ga;
(2) when M consists of or includes Yb, then Q is selected from at least one of Al and Ga; and
(3) when Z consists of or includes Ba and X consists of or includes S, then at least 50 atomic percent of Q is In.

The minimum quantity of europium and/or ytterbium (wherein y is at least 0.0001) has been found to insure the bright luminescence of the novel compounds.

An alternative description of the novel compositions of this invention is according to the formula $$MQ_2X_4$$

wherein:

M consists of at least 0.01 atomic percent Eu and/or Yb and up to 99.99 atomic percent Ca, Sr and/or Ba,
Q is selected from at least one of Al, Ga, and In, and
X is selected from at least one of S and Se, with the provisos that:

(1) when M includes Ca, then Q is Ga;
(2) when M consists of or includes Yb, then Q is selected from at least one of Al and Ga; and
(3) when M includes Ba and at the same time X consists of or includes S, then at least 50 atomic percent of Q is In.

2. Process

Compositions of the present invention are prepared by heating together at about 750° to 1300° C., appropriate, approximately stoichiometrically required quantities of reactants selected from (a) elementary Eu, Yb, Ca, Sr, Ba, Al, Ga, In, S and Se,
(b) chalcogenides of the formula Z(S,Se) where Z is Ca, Sr, Ba, or Eu; and $Q_2(S,Se)_3$ where Q is Al, Ga or In,
(c) polynary tetrachalcogenides represented by the formula $(Eu,Yb,Ca,Ba,Sr)(Al,Ga,In)_2(S,Se)_4$ (especially useful when preparing chalcogenides containing more than 4 elements), and
(d) combinations of the above.

In the formulas written above and hereafter in this application, atoms which may replace each other are separated by a comma and placed between parentheses as described in "Definitive Rules for Nomenclature of Inorganic Chemistry," J. Am. Chem. Soc. 82, 5532 (1960). Thus the symbol (Al,Ga) denotes the complete range from pure Al to pure Ga.

Reaction is customarily effected under nonoxidizing conditions in the absence of air, conveniently in silica tubes which have been charged, evacuated, and sealed. Since certain of the elementary reactants have some tendency to react with silica at the elevated temperatures required for reaction, it is advantageous, though not essential, to precoat the inside of silica tubes with carbon, for instance, by pyrolyzing a hydrocarbon therein; or, the reactants may be placed in an inert vessel such as a graphite, alumina, or zirconia crucible which is placed in an evacuated reaction vessel. When very high temperatures are desired, the reactants may be placed within induction-heated graphite crucibles located in evacuated and sealed vessels which may be silica vessels if they are insulated from the crucibles or otherwise provided with cooling means.

The time of heating is not critical but should be sufficient for complete reaction. At temperatures of 1000° to 1200° C., 24–96 hours usually suffices for complete reaction though the heating time may be extended if desired. When elementary selenium and, especially sulfur, which have relatively high vapor pressures are employed as reactants, it is desirable to maintain a temperature gradient in the reaction tube to permit unreacted chalcogen to condense in the cooler end of the tube.

After the chalcogen has reacted, the reactor may be heated uniformly. The hotter end of the tube may, for example, be held initially at about 750° to 1000° C. with the cooler end at 300° to 800° C. The preliminary reaction of the chalcogen may take up to 12–24 hours or more after which the temperature may be raised to about 1200° C. to complete reaction. The temperature gradient may be achieved by partially inserting the reaction tube into the furnace, by employing a furnace with a natural temperature gradient, or by employing a furnace with zones held at different temperatures. Once elementary chalcogen has reacted, the tube may, if desired, be cooled and opened and the product ground and fired again. This sometimes affords a more homogeneous product. A temperature gradient is not required when free chalcogen is not employed, as for example in the reactions represented by Equations (5), (6), (8), (10) and (11) below.

Pressure is not critical and the reaction can be effected at autogenous pressure in reactors that have been evacuated and shut or sealed prior to reaction.

Use of highly pure reactants is not essential and, dependent upon the desired purity of product, reactants ranging from "commercial grade" to ultrahigh purity grades may be employed. The reactants are preferably powdered and well mixed before heating is commenced.

Some typical reactions that yield the products of the invention are:

(1) $Yb + 2Ga + 4S \rightarrow YbGa_2S_4$ (2) $Eu + 2In + 2S + 2Se \rightarrow EuIn_2S_2Se_2$ (3) $EuSe + 2Ga + 3Se \rightarrow EuGa_2Se_4$ (4) $EuS + 2Al + 3S \rightarrow EuAl_2S_4$ (5) $EuS + Ga_2S_3 \rightarrow EuGa_2S_4$ (6) $EuS + In_2S_3 \rightarrow EuIn_2S_4$ (7) $0.9Ca + 0.1EuS + 2Ga + 4Se \rightarrow Ca_{0.9}Eu_{0.1}Ga_2Se_4$ (8) $SrGa_2S_4 + EuIn_2Se_4 \rightarrow 2Eu_{0.5}Sr_{0.5}GaInS_2Se_2$ (9) $0.95CaS + 0.05EuS + 3S \rightarrow Eu_{0.5}Ca_{0.95}GaS_4$

(10) $BaS + EuS + Al_2S_3 + In_2S_3 \rightarrow 2Ba_{0.5}Eu_{0.5}AlInS_4$

(11) $0.85BaS + 0.15EuS + 0.25Ga_2S_3 + 0.75In_2S_3 \rightarrow Ba_{0.85}Eu_{0.15}Ga_{0.5}In_{1.5}S_4$

(12) $0.9EuS + 0.05SrS + 0.05BaS + 0.5Al_2Se_3 + 0.5In_2Se_3 \rightarrow Sr_{0.05}Ba_{0.05}Eu_{0.9}AlInSSe_3$

DETAILS OF THE INVENTION

1. Product

The novel products of this invention include the ternary compositions $EuAl_2S_4$, $EuAl_2Se_4$, $EuGa_2S_4$, $EuGa_2Se_4$, $EuIn_2S_4$, $EuIn_2Se_4$, $YbAl_2S_4$, $YbAl_2Se_4$, $YbGa_2S_4$, and $YbGa_2Se_4$, and their solid solutions with each other. In addition, polynary products of the invention include solid solutions derived from as little as 0.0001 mole of any of the above ternary chalcogenides or their solid solutions with each other, with up to 0.9999 mole of one or more of $CaGa_2S_4$      $SrIn_2Se_4$
$CaGa_2Se_4$     $BaAl_{2-x}In_xS_4$
$SrAl_2S_4$       $BaAl_2Se_4$
$SrAl_2Se_4$      $BaGa_{2-x}In_xS_4$
$SrGa_2S_4$      $BaGa_2Se_4$
$SrGa_2Se_4$     $BaIn_2S_4$
$SrIn_2S_4$       $BaIn_2Se_4$ where $x$ is equal to at least 1. It is to be understood that solid solutions of this invention are homogeneous compositions of single crystalline phase and not simply mixtures. Complete solid solution of one phase in another is meant, e.g., of $y$ moles of $EuGa_2Se_4$ in $(1-y)$ moles of $SrIn_2S_4$ to give pseudo-orthorhombic-type crystals of $Sr_{1-y}Eu_yGa_{2y}In_{2-2y}Se_{4y}S_{4-4y}$, or if $y=0.3$, single phase crystals of $(Sr_{0.7}Eu_{0.3})(Ga_{0.6}In_{1.4})(Se_{1.2}S_{2.8})$. Similarly, $y$ moles of $YbGa_2S_4$ disolves in $1-y$ moles of $CaGa_2S_4$ to give $Ca_{1-y}Yb_yGa_2S_4$.

Generic formula

All products of the invention are described by the general formula $$Z_{1-y}M_yQ_2X_4$$

wherein:

M is selected from at least one of Eu and Yb,
Z is selected from at least one of Ca, Sr, and Ba,
Q is selected from at least one of Al, Ga, and In,
X is selected from at least one of S and Se, and
$y$ is 0.0001 to 1, with the provisos that:

(1) when Z consists of or includes Ca, then Q is Ga,
(2) when M consists of or includes Yb, then Q is selected from at least one of Al and Ga, and
(3) when Z consists of or includes Ba and at the same time X consists of or includes S, then at least 50 atomic percent of Q is In.

Subgeneric formulas

When $y=1$, and accordingly Ca, Sr, and Ba are absent, products of the invention can be represented by the subgeneric formulas:

(A) $Eu(Al,Ga,In)_2(S,Se)_4$
(B) $Yb(Al,Ga)_2(S,Se)_4$, and
(C) $(Eu,Yb)(Al,Ga)_2(S,Se)_4$.

When $y$ is 0.0001 to less than 1, products of the invention may be represented by the following subgeneric formulas:

(D) $(Ca,Sr,Ba)_{1-y}(Eu,Yb)_yGa_2Se_4$
(E) $(Sr,Ba)_{1-y}Eu_y(Al,Ga,In)_2Se_4$
(F) $Sr_{1-y}Eu_y(Al,Ga,In)_2(S,Se)_4$
(G) $(Sr,Ba)_{1-y}Eu_y(Al_aGa_bIn_c)_2(S,Se)_4$, wherein $c=0.5-1$ and $a+b+c=1$
(H) $(Sr,Ba)_{1-y}(Eu,Yb)_y(Al,Ga)_2Se_4$
(I) $(Ca,Sr)_{1-y}(Eu,Yb)_yGa_2(S,Se)_4$
(J) $Sr_{1-y}(Eu,Yb)_y(Al,Ga)_2(S,Se)_4$ In the above Formulas A–J and throughout this specification, it is to be understood that elements placed between parentheses and separated by commas may replace each other in any proportion provided the overall stoichiometry required by the formula is preserved.

All compositions falling within the scope of the invention will not be listed specifically. By way of illustration, however, compositions falling under Formulas A, B, C and D above will be specifically listed, and a selected group of compositions and subgeneric formulas describing them will be given in Table I. It should be remembered that the relationships between Z, M, Q and X are determined according to the formula $Z_{1-y}M_yQ_2X_4$ wherein $y=0.0001$ to 1.

Compositions represented by Formula A are as follows:

| M | Q | X |
|---|---|---|
| Eu | (Al, Ga, In) | (S, Se) |
| Eu | (Al, Ga, In) | S |
| Eu | (Al, Ga, In) | Se |
| Eu | (Al, Ga) | (S, Se) |
| Eu | (Al, Ga) | S |
| Eu | (Al, Ga) | Se |
| Eu | (Al, In) | (S, Se) |
| Eu | (Al, In) | S |
| Eu | (Al, In) | Se |
| Eu | (Ga, In) | (S, Se) |
| Eu | (Ga, In) | S |
| Eu | (Ga, In) | Se |
| Eu | Al | (S, Se) |
| Eu | Al | S |
| Eu | Al | Se |
| Eu | Ga | (S, Se) |
| Eu | Ga | S |
| Eu | Ga | Se |
| Eu | In | (S, Se) |
| Eu | In | S |
| Eu | In | Se |

Compositions falling under Formula B are as follows:

| M | Q | X |
|---|---|---|
| Yb | (Al, Ga) | (S, Se) |
| Yb | (Al, Ga) | S |
| Yb | (Al, Ga) | Se |
| Yb | Al | (S, Se) |
| Yb | Al | S |
| Yb | Al | Se |
| Yb | Ga | (S, Se) |
| Yb | Ga | S |
| Yb | Ga | Se |

Compositions falling under Formula C that are not included in the compositions falling under (A) and (B) are as follows:

| M | Q | X |
|---|---|---|
| (Eu, Yb) | (Al, Ga) | (S, Se) |
| (Eu, Yb) | (Al, Ga) | S |
| (Eu, Yb) | (Al, Ga) | Se |
| (Eu, Yb) | Al | (S, Se) |
| (Eu, Yb) | Al | S |
| (Eu, Yb) | Al | Se |
| (Eu, Yb) | Ga | (S, Se) |
| (Eu, Yb) | Ga | S |
| (Eu, Yb) | Ga | Se |

Compositions falling under Formula D are as follows:

| Z | M | Q | X |
|---|---|---|---|
| (Ca, Sr, Ba) | (Eu, Yb) | Ga | Se |
| (Ca, Sr, Ba) | Eu | Ga | Se |
| (Ca, Sr, Ba) | Yb | Ga | Se |
| (Ca, Sr) | (Eu, Yb) | Ga | Se |
| (Ca, Sr) | Eu | Ga | Se |
| (Ca, Sr) | Yb | Ga | Se |
| (Ca, Ba) | (Eu, Yb) | Ga | Se |
| (Ca, Ba) | Eu | Ga | Se |
| (Ca, Ba) | Yb | Ga | Se |
| (Sr, Ba) | (Eu, Yb) | Ga | Se |
| (Sr, Ba) | Eu | Ga | Se |
| (Sr, Ba) | Yb | Ga | Se |
| Ca | (Eu, Yb) | Ga | Se |
| Ca | Eu | Ga | Se |
| Ca | Yb | Ga | Se |
| Sr | (Eu, Yb) | Ga | Se |
| Sr | Eu | Ga | Se |
| Sr | Yb | Ga | Se |
| Ba | (Eu, Yb) | Ga | Se |
| Ba | Eu | Ga | Se |
| Ba | Yb | Ga | Se |

In Table I are listed selected compositions and the subgeneric formulas that described them:

TABLE I

| Subgeneric Formula | Z | M | Q | X |
|---|---|---|---|---|
| (I) | (Ca, Sr) | Eu | Ga | S |
| (I) | Ca | Eu | Ga | S |
| (G) | (Sr, Ba) | Eu | $(Al_a, Ga_b, In_c)$ | S |
| (E), (F) | Sr | Eu | (Al, Ga, In) | S |
| (G) | Ba | Eu | $(Al_a, Ga_b, In_c)$ | S |
| (I) | (Ca, Sr) | Yb | Ga | S |
| (I) | Ca | Yb | Ga | S |
| (J) | Sr | Yb | (Al, Ga) | S |
| (I) | (Ca, Sr) | (Eu, Yb) | Ga | S |
| (I) | Ca | (Eu, Yb) | Ga | S |
| (J) | Sr | (Eu, Yb) | (Al, Ga) | S |
| (I) | (Ca, Sr) | Eu | Ga | (S, Se) |
| (I) | Ca | Eu | Ga | (S, Se) |
| (G) | (Sr, Ba) | Eu | $(Al_a, Ga_b, In_c)$ | (S, Se) |
| (F) | Sr | Eu | (Al, Ga, In) | (S, Se) |
| (G) | Ba | Eu | $(Al_a, Ga_b, In_c)$ | (S, Se) |
| (I) | (Ca, Sr) | Yb | Ga | (S, Se) |
| (I) | Ca | Yb | Ga | (S, Se) |
| (J) | Sr | Yb | (Al, Ga) | (S, Se) |
| (I) | (Ca, Sr) | (Eu, Yb) | Ga | (S, Se) |
| (I) | Ca | (Eu, Yb) | Ga | (S, Se) |
| (J) | Sr | (Eu, Yb) | (Al, Ga) | (S, Se) |
| (D) | (Ca, Sr, Ba) | Eu | Ga | Se |
| (D), (I) | (Ca, Sr) | Eu | Ga | Se |
| (D), (I) | Ca | Eu | Ga | Se |
| (E) | (Sr, Ba) | Eu | (Al, Ga, In) | Se |
| (E), (F) | Sr | Eu | (Al, Ga, In) | Se |
| (D) | (Ca, Ba) | Eu | Ga | Se |
| (E) | Ba | Eu | (Al, Ga, In) | Se |
| (D) | (Ca, Sr, Ba) | Yb | Ga | Se |
| (D), (I) | (Ca, Sr) | Yb | Ga | Se |
| (D), (I) | Ca | Yb | Ga | Se |
| (H) | (Sr, Ba) | Yb | (Al, Ga) | Se |
| (H), (J) | Sr | Yb | (Al, Ga) | Se |
| (D) | (Ca, Ba) | Yb | Ga | Se |
| (H) | Ba | Yb | (Al, Ga) | Se |
| (D) | (Ca, Sr, Ba) | (Eu, Yb) | Ga | Se |
| (D), (I) | (Ca, Sr) | (Eu, Yb) | Ga | Se |
| (D), (I) | Ca | (Eu, Yb) | Ga | Se |
| (H) | (Sr, Ba) | (Eu, Yb) | (Al, Ga) | Se |
| (H), (J) | Sr | (Eu, Yb) | (Al, Ga) | Se |
| (D) | (Ca, Ba) | (Eu, Yb) | Ga | Se |
| (H) | Ba | (Eu, Yb) | (Al, Ga) | Se |
| (F) | Sr | Eu | (Al, In) | (S, Se) |

(A) Product identity

Product identity is conveniently established by Debye-Scherrer X-ray powder diffraction technique and/or Buerger precession camera technique, the X-ray patterns being compared with that of a previously-identified tetrachalcogenide. Patterns were generally read and cell constants refined using a computerized least-squares technique. Cell constants and cell volumes are reported in Table III.

Single crystal X-ray methods indicate that an orthorhombic cell can be used to index most of the peaks of the X-ray powder diffraction patterns of the novel products taught herein. All peaks can be indexed by using an orthorhombic cell in which all the axes are doubled. Careful investigation of single crystal data indicates that systematic absences of reflections do not conform to any orthorhombic space group and suggests that the observed orthorhombic symmetry is due to crystal twinning. The actual symmetry is lower than orthorhombic and either monoclinic or triclinic. Thus the orthorhombic cell is a pseudo cell which is useful for phase identification and for determining relative cell volumes.

The compositions of this invention have crystal structures indexable on the basis of pseudo-orthorhombic crystal cells with cell constants of $a = 10.0 - 11.3$ A.
$b = 6.0 - 6.8$ A.
$c = 10.0 - 11.34$ A.
cell volume $= 600 - 870$ A.$^3$.

(B) Homogeneous products containing small quantities of rhombohedral tetrachalcogenides Tetrachalcogenides of related but distinctly different chemical composition and crystal structure are described in coassigned application, CR 7090–B, filed herewith. Therein is described and claimed semiconducting compositions of rhombohedral-type crystal structure and formula $$AQ^1_2X^1_4$$

wherein A consists of 80 to 100 atomic percent Ba, and 0 to 20 atomic percent of one or both of Sr and Eu, and 0 to 10 atomic percent of one or both of Ca and Yb, $Q^1$ consists of 66 to 100 atomic percent of one or both of Al and Ga and 0 to 34 atomic percent In; and $X^1$ consists of 10 to 100 atomic percent S and 0 to 90 atomic percent Se.

Up to about 1 mole percent by weight of these compositions of CR 7090–B may be homogeneously incorporated into the pseudo-orthorhombic-type compositions of the present invention. Incorporation of increasingly larger quantities results first in a mixture of semiconductive pseudo-orthorhombic and rhombohedral-type crystal phases and finally when the concentration of $Z_{1-y}M_yQ_2X_4$ becomes low, in homogeneous products of rhombohedral-type crystal structure.

(C) Polyphase products

Semiconductors with polyphase structures and empirical chemical compositions intermediate between those of the present invention and those of coassigned application CR 7090–B may be prepared by methods described for the instant invention without change other than employing the ingredients in quantities theoretically capable of giving the desired product. Typical of such intermediate products are polyphase compositions of empirical formula $Ba_{0.25}Eu_{0.75}Ga_2S_4$, $Ba_{0.5}Eu_{0.5}Al_2S_4$, and $Ba_{0.7}Eu_{0.3}AlGaS_4$.

Intermediate compositions usually exhibit the X-ray diffraction patterns of both pseudo-orthorhombic and rhombohedral-type phases and, in fact, are usually separable manually into discrete phases, one giving a pseudo-orthorhombic-type X-ray diffraction pattern and the other a rhombohedral-type X-ray diffraction pattern. For example, reaction of a mixture of BaS, EuS, Ga and S in 0.5:0.5:2:3 formula weight ratio and 0.05 g. iodine for 96 hours in an evacuated, sealed silica tube with one end of the tube at 860° C. and the other end at 500° C. resulted in a yellow-green product that fluoresced in daylight. The product was manually separated into two fractions, one of which emitted green light and the other yellow light upon exposure to UV radiation. The yellow-emitting material gave an X-ray diffraction pattern typical of pseudo-orthorhombic $EuGa_2S_4$ but with some shifting of lines indicative of a slightly larger crystal cell. The fraction that fluoresced in the green gave an X-ray powder diffraction pattern like that of rhombohedral-type $BaGa_2S_4$, but with shifting lines indicative of formation of a smaller cell.

(D) Doping

Compositions of the invention may be doped to alter semiconductivity (e.g., to lower their resistivity) and/or fluorescence (e.g., to change the color or shade of emitted radiation). This may be accomplished by bringing about a slight imbalance in the ideal stoichiometric ratio of 1M:2Q:4X or by introducing a foreign ion into the crystal lattice. The imbalance may be achieved by slightly altering the theoretically required quantities of reactants, and small quantities of foreign ions may be introduced simply by having them present during synthesis. In either case, synthesis is effected in the usual manner. Alternatively, a product of the invention may be calcined in contact with or in the vapor of one of its elemental components or a foreign element. Another route is to dope a starting material of the type described in Table II and then use the doped material as a reagent in preparing products of the invention.

Dopants may be chosen to partially occupy one or more lattice positions in $Z_{1-y}M_yQ_2X_4$, where Z, M, Q, X and y have their previously designated meanings. Thus, Z, and possibly M, may be partially replaced by large cations with ionic radii of about 0.9–1.5A, e.g., by rare earth metals of atomic number 57–71 (exclusive of Eu and Yb), Na, K, Rb, Bi, Pb, U, Cd, Hg, Ag, and Au. Smaller cations with ionic radii of 0.4 to less than 0.9A. may be partially substituted for Q metals; these include the transition elements of atomic numbers 21–30, 39–46, and 72–78, and Si, Ge, and Sn from Group IV–A of the Periodic Table. Typical anionic elements that may partially replace sulfur and selenium include Cl, Br, I, Te, P, As and O.

The quantity of dopant required to alter fluorescence and/or semiconductive properties is generally small, ranging from less than 0.002 to about 1 atomic percent of the element that is partially replaced. If desired, more than one dopant may be incorporated simultaneously. Incorporation of dopants is exemplified in Examples A, D and E.

2. Process

Binary sulfides and selenides of Formula ZS and ZSe where Z is $Eu^{2+}$, $Ca^{2+}$, $Sr^{3+}$ and $Ba^{3+}$, suitable for use as reactants, are well known.

The sulfides and selenides $Al_2S_3$, $Al_2Se_3$, $Ga_2S_3$, $Ga_2Se_3$, $In_2S_3$ and $In_2Se_3$ are also well known. Their preparation is described, for example, by G. Brauer in "Handbuch der Präparativen Anorganischen Chemie," Ferdinand Enke Verlag Stuttgart, 1954.

Preparation of ternary and polynary tetrasulfides and tetraselenides which may themselves be used in preparing the products of the invention, e.g., by reactions such as $$SrGa_2Se_4 + EuIn_2Se_4 \rightarrow Sr_{0.5}Eu_{0.5}GaInSe_4$$
$$CaGa_2S_4 + YbIn_2Se_4 \rightarrow Ca_{0.5}Yb_{0.5}GaInS_2Se_2,$$

and $$BaIn_2Se_4 + EuIn_2Se_4 \rightarrow Ba_{0.5}Eu_{0.5}In_2Se_4,$$

is described in Table II. The procedures are much like those used in preparing the europium and ytterbium-containing tetrachalcogenides of the invention and involve reaction of the elements and/or thir chalcogenides in the approximate stoichiometrically required quantities for several days at temperatures of about 750° to 1200° C. in evacuated, sealed reaction vessels, e.g.:

$$Ca + 2Ga + 4S \rightarrow CaGa_2S_4$$
$$BaSe + In_2Se_3 \rightarrow BaIn_2Se_4$$
$$SrS + 2Al + 3S \rightarrow SrAl_2S_4$$
$$SrGa_2Se_4 + BaIn_2Se_4 \rightarrow Ba_{0.5}Sr_{0.5}GaInSe_4$$
$$Sr + 2Al + 4S \rightarrow SrAl_2S_4$$

When free sulfur or selenium is used as a reactant, it is desirable to heat initially somewhat below maximum temperature to avoid excessive pressure buildup and to permit uncombined sulfur and selenium to condense in the cooler end of the reactor. Free sulfur-containing systems usually require somewhat lower initial temperatures than selenium-containing systems. Rather than maintaining a temperature gradient, temperatures may be raised gradually over a period of hours from about 600° C. to a maximum temperature of above 1200° C. Alternatively, a period at moderate temperature (about 600° C.) may be followed by a period at maximum temperature.

When elements are employed as reactants, it is desirable, though not imperative, to add a small quantity of iodine to the reaction mixture, e.g., about 0.05 g. per gram of total charge. The iodine may promote reaction by preventing formation of sulfide crusts rather than acting simply as a transport agent. It may in addition form small fluxing quantities of $ZI_2$. Alternatively, small quantities of the halides of divalent Eu, Ca, Sr, or Ba or trivalent Al, Ga, or In may be employed as fluxes to permit the use of lower reaction temperatures and the formation of larger crystals of product.

The products of the invention usually form in the hot zone of the reaction vessel as sintered or fused masses, which in some cases include single crystals. The products are removed after cooling and washed with water or solvents, e.g., aqueous potassium hydroxide, to remove impurities such as traces of selenium. Crystal growth is sometimes enhanced by cooling slowly, e.g., from a melt of the product.

Large crystals of many of the compositions of the invention may be grown from the melt. The melting points of $EuGa_2S_4$, $EuGa_2Se_4$, and of $EuIn_2Se_4$ are, respectively, about 1215° C., 1110° C., and 1010° C., consequently crystals may be grown by placing the pre-prepared material in a suitable container such as an alumina or graphite crucible, heating in vacuo above the melting point, and cooling slowly. Generally the slower the rate, the better the crystal growth. The shape of the container may be such as to enhance crystal growth. For example, the bottom end of a vertical container may terminate in a point which may be cooled to initiate crystallization of material therein before the bulk of the material simply by slowly lowering the pointed end of the container out of the hot zone of the furnace.

3. Preparation of starting materials

Preparation of some representative polynary starting materials is described in Table II. These materials have pseudo-orthorhombic crystal structures like those of the products of the invention.

TABLE II.—PREPARATION OF SOME REPRESENTATIVE STARTING MATERIALS

| Prep. No. | Composition | Reactants | Reaction conditions | a | b | c | V | Remarks |
|---|---|---|---|---|---|---|---|---|
| A | $SrGa_2Se_4$ | Sr/Ga/Se in 1/2/4 atomic ratio 0.05 g. $I_2$. | Brought slowly to 1,200° C. over 4 days in sealed, evacuated silica tube in nongradient furnace. | 10.711 | 6.385 | 10.864 | 742.9 | Washed with dilute KOH. Product was brownish-white. |
| B | $SrIn_2S_4$ | 0.5189 g. (0.00591 atom) Sr, 1.3601g. (0.01185 atom) In, 0.7597 g. (0.0237 atom) S, 0.05 g. $I_2$. | Heated in sealed evacuated silica tube in natural gradient furnace for 3 days with 890° C. in hot zone and 400° C. in cool zone. Reground and fired for 3 days with 950° C. in hot zone and 600° C. in cool zone. | 10.548 | 6.510 | 10.439 | 716.9 | Pink microcrystalline product with structure like that of $EuGa_2S_4$. Small amt. of red-black $In_2S_3$ was also present. |
| C | $BaIn_2S_4$ | 0.1909 g. (0.001127 mole) BaS, 0.2588 g. (0.002153 atom) In, 0.1084 g. (0.00338 atom) S, 0.05 g. $I_2$. | Heated in sealed evacuated silica tube in natural gradient furnace for 2 days with 1,000° C. in hot zone and 600° C. in cool zone. | 10.840 | 6.556 | 10.885 | 773.5 | Pink crystals formed in hot zone and small quantity of red crystals in cool zone. The pink crystals had a structure like $EuGa_2S_4$, and cell constants identifying them as $BaIn_2S_4$. Red crystals appeared to be largely $In_2S_3$. |
| D | $SrIn_2Se_4$ | 0.124 g. (0.00141 atom) Sr, 0.3251 g. (00283 atom) In, 0.4471 g. (0.00566 atom) Se, 0.05 g. $I_2$. | Heated in graphite crucible Within sealed, evacuated silica tube in natural gradient furnace for 2 days with 1,000° C. in hot zone and 800° C. in cool zone. | 10.938 | 6.728 | 11.017 | 810.8 | Washing product with dilute KOH left dark red-orange material which had the $EuGa_2S_4$ structure. |
| E | $SrGa_2S_4$ | Sr/Ga/S in 1/2/4 atomic ratio; 0.05 g. $I_2$. | Heated in $Al_2O_3$ crucible in silica tube for 3 days at 930° C. and for 3 days at 1,050° C. | 10.255 | 6.107 | 10.424 | 652.8 | Homogeneous red-pink product shown to be $SrGa_2S_4$ by analogy of structure to that of $EuGa_2S_4$. Some $SrGa_2S_4$ preparations have fluoresced feebly in U.V. light, seemingly because of trace amounts of unknown activators. |
| F | $CaGa_2Se_4$ | 0.0809 g. (0.00202 atom) Ca, 0.2815 g. (0.00404 atom) Ga, 0.6376 g. (0.00808 atom) Se, 0.05 g. $I_2$. | Heated in evacuated sealed silica tube 2 days with 600° C. in hot zone and 400° C. in cool zone. Reheated 2 days in the natural gradient furnace with 1,000° C. in hot zone and 800° C. in cool zone. | 10.506 | 6.343 | 10.521 | 701.0 | Product formed from the melt in the hot zone consisted of pink crystals which became clear white upon washing with conc. KOH. Structure and density confirm the formula. Density: calc., 4.69 g./cm.³; found, 4.66 g./cm.³. Semiconductor with $P_{289°K}=10^{10}$ ohm-cm. |
| G | $BaIn_2Se_4$ | 0.1662 g. (0.00121 atom) Ba, 0.2779 g. (0.00242 atom) In, 0.3822 g. (0.00484 atom) Se, 0.05 g. $I_2$. | Heated in evacuated sealed silica tube in natural gradient furnace for 2 days with 800° C. in hot zone and 600° C. in cool zone. Reheated for 1 day with 1,000° C. in hot zone and 800° C. in cool zone. | 11.262 | 6.785 | 11.335 | 866.2 | Product consisted of clear to orange crystals interspersed with a little black material. The orange and clear crystals were identified by X-ray diffraction. |
| H | $CaGa_2S_4$ (0.0130 atom) Ga, | 0.2605 g. (0.0065 atom) Ca, 0.9061 g. 0.8334 g. (0.026 atom) S, 0.05 g. $I_2$. | Heated 3 days in graphite crucible within evacuated sealed silica tube in natural gradient furnace with 1,000° C. in hot zone and 900° C. in cool zone. | 10.026 | 5.97 | 10.215 | 611.0 | Pink-white $CaGa_2S_4$ formed in the hot zone. |
| I | $BaGa_2Se_4$ | 0.2118 g. (0.00154 atom) Ba, 0.2150 g. (0.00308 atom) Ga, 0.487 g. (0.00616 atom) Se, 0.05 g. $I_2$. | Heated in evacuated sealed silica tube for 2 days in natural gradient furnace with 1,000° C. in hot zone and 700° C. in cool zone. Reheated for 2 days with 1,000° C. in hot zone and 900° C. in cool zone. | 10.64 | 6.390 | 11.525 | 769.8 | Sintered brownish product in hot zone had powder pattern like that of $EuGa_2S_4$. |
| J | $SrAl_2S_4$ | 0.3042 g. (0.00347 atom) Sr, 0.1873 g. (0.00694 atom) Al, 0.4453 g. (0.01388 atom) S, 0.05 g. $I_2$. | Heated in evacuated sealed silica tube for 2 days in natural gradient furnace with 1,000° C. in hot zone and 600° C. in cool zone. | 10.227 | 6.065 | 10.429 | 646.8 | Orange flaky crystalline product with X-ray diffraction pattern like that of $EuGa_2S_4$. |
| K | $Sr_{0.5}Ba_{0.5}GaInS_4$ | Pre-prepared $SrGa_2S_4$ and $BaIn_2S_4$ were ground together in a 1:1 mole ratio. | The mixture was heated in a sealed evacuated silica tube for 3 days at 1,000° C. | 10.550 | 6.322 | 10.658 | 711.9 | Product gave a single-phase $EuGa_2S_4$-type X-ray diffraction pattern. The calculated cell volume of 713A.³ indicates nearly perfect solid solubility. |
| L | $BaInGaS_4$ | 0.3763 g. (0.00222 mole) BaS, 0.2551 g. (0.00222 atom) In, 0.1549 g. (0.00222 atom) Ga, 0.2137 g. (0.0067 atom) S, 0.05 g. $I_2$. | Sealed in evacuated quartz tube and heated in natural gradient furnace for 2 days with hot zone at 960° C. and cool zone at 400° C. Reground and heated at 1,000° C. for 2 days. | 10.65 | 6.424 | 10.861 | 743.4 | Reddish-orange product gave a single-phase $EuGa_2S_4$-type X-ray diffraction pattern. |

PREFERRED EMBODIMENTS

Examples 1 to 28, summarized in Table III, are offered as illustrative of the invention and are not meant to limit the invention. Detailed Debye-Scherrer x-ray powder diffraction data for the products of Examples 1, 2, 4, 5 and 6 are given in Tables IV, V, VI, VII, and VIII, respectively. Resistivity measurements and thermoelectric power measurements were made at room temperature.

TABLE III.—EXAMPLES 1–28

| Ex. No. | Product | Reactants | Reaction conditions | Cell constants (A.) and cell volume (A.$^3$) | | | | Remarks |
|---|---|---|---|---|---|---|---|---|
| | | | | a | b | c | V | |
| 1 | $EuGa_2S_4$ | 0.42 g. (0.0023 mole) EuS, 0.3182 g. (0.0046 atom) Ga, 0.2236 g. (0.007 atom) S, 0.05 g. $I_2$. | Sealed in evacuated silica tube; heated for 48 hours in natural gradient furnace with hot zone at 850° C. and cool zone at 300° C. | 10.233 | 6.108 | 10.354 | 646.5 | Yellow product formed on hot zone. Pseudo-orthorhombic crystal symmetry Fluoresced in both UV and in daylight with emission-peak at 5430A. Semiconductor with $\rho_{298}°$ [к.=2×10$^8$ ohm cm. |
| 2 | $YbGa_2S_4$ | 0.3524 g. (0.002 atom) Yb, 0.284 g. (0.004 atom) Ga, .2612 g. (0.008 atom) S, 0.05 g. $I_2$. | Sealed in evacuated silica tube; heated 3 days in natural gradient furnace with hot zone at 800° C. and cool zone at 400° C.; reheated for 2 days with 1100° C. in hot zone and 800° C. in cool zone. | 10.041 | 6.066 | 10.056 | 612.5 | Brown-red product in hot zone. Structure pseudo-orthorhombic. |
| 3 | $YbGa_2Se_4$ | 0.3189 g (0.00185 atom) Yb, 0.257 g. (0.0037 atom) Ga, .5821 g. (0.0074 atom) Se, 0.05 g. $I_2$. | Sealed in evacuated silica tube; heated 2 days in natural gradient furnace with hot zone at 950° C. and cool zone at 600° C. Reheated 2 days at 1,000° C with no gradient. | 10.485 | 6.338 | 10.501 | 697.7 | Product which consisted of red crystals plus a few white needles was washed with KOH solution and water, leaving only red crystals and trace of black material. Red crystals were semiconducting $YbGa_2Se_4$ with $\rho_{298}°$ к.=4×10$^5$ and $E_a$=0.3 ev. |
| 4 | $EuIn_2S_4$ | 0.1842 g. (0.001 mole) EuS, 0.230 g. (0.002 atom) In, 0.0963 g. (0.003 atom) S, 0.05 g. $I_2$. | Sealed in evacuated silica tube and heated 2 days in natural gradient furnace with 750° C. in hot zone and 300° C. in cool zone. Reheated 4 days with 1000° C. in hot zone and 600° C. in cool zone. | 10.490 | 6.497 | 10.360 | 706.07 | Product which was mostly yellow in color fluoresced dull red only at liquid nitrogen temperature. It was a semiconductor with $\rho_{298°}$ к.=3×10$^{11}$ ohm-cm. |
| 5 | $EuGa_2Se_4$ | EuSe/Ga/Se in 1/2/3 molar ratio; 0.05 g. $I_2$. | Sealed in silica tube protected by a thin layer of carbon on the inside deposited by pyrolyzing benzene therein at 900° C. Natural gradient furnace for 2 days with 800° C. in hot zone and 600° C. in cool zone. | 10.666 | 6.3754 | 10.7945 | 734.0 | Yellow-orange $EuGa_2Se_4$ formed in the hot zone. It was fluorescent with a peak at 528 millimicrons. |
| 6 | $EuAl_2S_4$ | 0.4876 g. (0.00265 mole) EuS, 0.1430 g. (0.0053 atom) Al, 0.2549 g. (0.0079 atom) S, 0.05 g. $I_2$. | Heated in an $Al_2O_3$ crucible within an evacuated silica tube for 2 days at 800° C. (no gradient). Reheated at 1,000° C. for 2 days. | 10.193 | 6.060 | 10.374 | 640.8 | Large yellow flakes and yellow microcrystals of $EuAl_2S_4$. Anal. Cal'cd. for $EuAl_2S_4$: Eu, 45.47; Al, 16.15; S, 38.38. Found: Eu, 45.69; Al, 15.80; S, 35.9. |
| 7 | $EuGa_2Se_4$ | EuSe/Ga/Se in 1/2/3 molar ratio; 0.05 g. $I_2$. | Heated in sealed evacuated silica tube for 3 days in natural gradient furnace with 1,000° C. in hot zone and 800° C. in cool zone. | | | | | Mixture partly melted during reaction. Washed with dilute KOH. Composition verified by X-ray diffraction, density (calc. for 4 $EuGa_2Se_4$/cell, 5.49 g./cm.$^3$; found 5.42 g./cm.$^3$), and analysis. Calc: Eu, 25.02; Ga, 22.96; Se, 52.01. Found: Eu, 25.00; Ga. 22.63; Se 52.53. |
| 8 | $YbAl_2S_4$ | 0.9742 g. (0.0056 atom) Yb, 0.3038 g. (0.0112 atom) Al, 0.7221 g. (0.0225 atom) S, 0.05 g. $I_2$. | Heated in sealed evacuated silica tube in natural gradient furnace for 3 days with 875° C. in hot zone and 300° C. in cool zone. | | | | | Most of the yellow product formed in hot zone, X-ray diffraction powder pattern like that of $YbGa_2S_4$ but with some additional lines. |
| 9 | $EuIn_2Se_4$ | 0.6622 g. (0.00286 mole) EuSe, 0.6585 g. (0.00574 atom) In, 0.6793 g. (0.0086 atom) Se, 0.05 g. $I_2$. | Heated in sealed evacuated silica tube in natural gradient furnace for 3 days with 975° C. in hot zone and 800° C. in cool zone. | 11.104 | 6.704 | 10.879 | 809.9 | Both large orange crystals growing from the melt and and covering the walls of the tube and a lump of orange material. showed the X-ray diffraction pattern of $EuIn_2Se_4$. Composition verified by density: Calc. 5.72 g./cm.$^3$; found 5.78 g./cm.$^3$. Product was a photoconductor and a semiconductor with $\rho_{298}°$ к.=2.3×10$_9$ ohm-cm. |
| 10 | $EuAl_2Se_4$ | 0.8852 g. (0.00383 mole) EuSe, 0.2096 g. (0.00777 atom) Al, 0.9080 g. (0.0115 atom) Se, 0.05 g. $I_2$. | Heated in sealed evacuated silica tube in natural gradient furnace for 3 days with 950° C. in hot zone and 700° C. in cool zone. | | | | | Yellow material formed in hot zone. Hydrolytically unstable hence X-ray diffraction pattern was not determined. Fluorescence of the material shows that is was $EuAl_2Se_4$. |
| 11 | $Ca_{0.9}Eu_{0.1}Ga_2Se_4$ | 0.0712 g. (0.00178 atom) Ca, 0.0456 g. (0.000198 mole) EuSe, 0.2753 g. (0.00395 atom) Ga, 0.6079 g. (0.0077 atom) Se. | Heated in evacuated sealed silica tube in natural gradient tube furnace for 2 days with 1,000° C. in hot zone and 700° C. in cool zone. Reheated for 3 days with hot zone at 1,000° C. and cool zone at 800° C. | 10.526 | 6.339 | 10.548 | 703.8 | Product was washed with conc. KOH. It consisted of bright gold-yellow crystals. Cell volume cal'cd. for $Ca_{0.9}Eu_{0.1}Ga_2Se_4$ is 704.3 A.$^3$ indicating that the formula is indeed very close to that represented. Product was highly fluorescent. |

See footnotes at end of table.

3,801,702

TABLE III—Continued

| Ex. No. | Product | Reactants | Reaction conditions | a | b | c | V | Remarks |
|---|---|---|---|---|---|---|---|---|
| 12 | $Sr_{0.5}Eu_{0.5}GaInS_2Se_2$ | Pre-prepared $SrGa_2S_4$[1] and $EuIn_2Se_4$ were ground together in a 1:1 mole ratio. | The mixture was heated in a sealed evacuated silica tube for 2 days at 1,000° C. | 10.628 | 6.427 | 10.608 | 724.6 | Product was a sintered, dark honey-colored material which gave the X-ray diffraction pattern only of $EuGa_2S_4$-type. The cal'cd. cell volume of 731 A.$^3$ indicates almost perfect solid solubility of the starting reactants. |
| 13 | $Yb_{0.5}Eu_{0.5}Ga_2S_4$ | Pre-prepared $YbGa_2S_4$ and $EuGa_2S_4$ were ground together in a 1:1 mole ratio. | ...do... | 10.134 | 6.075 | 10.374 | 638.7 | The brick-red product gave a single $EuGa_2S_4$-type X-ray diffraction pattern. The cal'cd. cell volume (629 A.$^3$) is very close to that predicted and indicates extensive solid solubility. |
| 14 | $Sr_{0.5}Yb_{0.5}Ga_2S_4$ | Pre-prepared $SrGa_2S_4$[1] and $YbGa_2S_4$ were ground together in a 1:1 mole ratio. | ...do... | 10.172 | 6.087 | 10.238 | 633.9 | The brick-red product gave a single $EuGa_2S_4$-type X-ray diffraction pattern. The cal'cd. cell volume of 633 A.$^3$ indicates nearly perfect solid solubility. |
| 15 | $Sr_{0.5}Eu_{0.5}GaInSe_4$ | Pre-prepared $SrGa_2Se_4$[2] and $EuIn^2Se^4$ were ground together in a 1:1 mole ratio. | ...do... | 10.846 | 6.569 | 10.864 | 774.0 | Product gave a single $EuGa_2S_4$-type X-ray diffraction pattern. The cal'cd. cell volume of 776 A.$^3$ indicates nearly perfect solid solubility. |
| 16 | $Sr_{0.5}Eu_{0.5}Ga_2S_{2.5}Se_{1.5}$ | Pre-prepared $EuGa_2Se_3S$ and $SrGa_2S_4$ were ground together in a 1:1 mole ratio. | The mixture was heated in a sealed evacuated silica tube for 12 hours at 900° C. | 10.388 | 6.189 | 10.534 | 677 | Product gave a single-phase $EuGa_2S_4$-type X-ray diffraction pattern. The cal'cd. cell volume of 678 A.$^3$ indicates nearly perfect solid solubility. |
| 17 | $Sr_{0.9}Eu_{0.1}In_2S_4$ | Sr/EuS/In/3 in 0.9/0.1/3.9 molar ratio; 0.05 g. $I_2$. | Sealed in evacuated silica tube and heated in natural gradient furnace for 2 days with hot zone at 960° C. and cool zone at 600° C. | 10.541 | 6.497 | 10.541 | 713.7 | Homogeneous orange crystalline product which gives a $EuGa_2S_4$-type X-ray diffraction pattern. Anal. Cal'cd. for $Sr_{0.9}Eu_{0.1}In_2S_4$: Sr, 17.44; Eu, 3.36; In, 50.81; S, 28.38. Found: Sr, 18.01; Eu, 2.65; In, 49.54; S, 29.33. |
| 18 | $EuGaInS_4$ | 0.5521 g. (0.003 mole) EuS, 0.2092 g. (0.003 atom) Ga, 0.344 g. (0.003 atom) In, 0.2886 g. (0.009 atom) S, 0.05 g. $I_2$. | Sealed in evacuated silica tube and heated 2 days at 1000° C. Reground and again heated at 1,000° C. for 3 days. | 10.251 | 6.307 | 10.343 | 668.6 | Yellow-gold microcrystalline product. The cal'cd. cell volume of 676 A.$^3$ indicates that extensive solid solution was achieved. |
| 19 | $Sr_{0.9}Eu_{0.1}Al_2S_4$ | Sr/EuS/Al/S in 0.9/0.1/2/3.9 molar ratio; 0.05 g. $I_2$. | Placed in $Al_2O_3$ crucible within evacuated sealed silica tube and heated 3 days at 980° C. with no temperature gradient. | | | | | Product consisted of mixture of red and green solids. The red solid had a rock salt-type structure. The green solid gave a $EuGa_2S_4$-type X-ray diffraction pattern and exhibited strong green fluorescence with a peak at 4,980A. |
| 20 | $Sr_{0.9}Eu_{0.1}Ga_2S_4$ | Sr/EuS/Ga/S in 0.9/0.1/2/3.9 molar ratio; 0.05 g. $I_2$. | Placed in $Al_2O_3$ crucible in evacuated, sealed silica tube and heated 4 days at 1050° C. Reground and heated at 1000-1300° C. for about 2 days. | | | | | The mixture melted during reaction. The plate-like crystalline product exhibited strong yellow-green fluorescence. Its X-ray diffraction pattern showed it to be a $EuGa_2S_4$-type phase. |
| 21 | $Ca_{0.95}Eu_{0.05}Ga_2S_4$ | CaS/EuS/Ga/S in 0.95/0.05/2/3 molar ratio; 0.05 g. $I_2$. | Sealed in evacuated silica tube and heated 2 days at 1000° C. Reground at 1000°C and heated for 1 day. | | | | | The yellow-cream-colored product exhibited strong yellow fluorescence and a $EuGa_2S_4$-type X-ray diffraction pattern. |
| 22 | $EuGa_2Se_3S$ | 0.378 g. (0.00205 mole) EuS, 0.2865 g. (0.0041 atom) Ga, 0.4867 g. (0.00616 atom) Se, 0.05 g. $I_2$. | Heated in evacuated sealed silica tube in natural gradient tube furnace for 3 days with 850° C. in hot end and 370° C. in cold end. | 10.512 | 6.291 | 10.658 | 704.9 | Orange-brown product formed in hot zone gave gave a $EuGa_2S_4$-type pattern and by Vegard's law had a formula of $EuGa_2Se_{2.9}S_{1.1}$. Semiconductor with $\rho_{298.v}$ = 7.4×10$^6$ ohm-cm- Thermal emf. = +1,600μv. per degree. Fluorescent when activated by U.V. radiation. |
| 23 | $Ba_{0.8}Eu_{0.2}Ga_2Se_4$ | 0.5805 g. (0.004226 atom) Ba, 0.244 g. (0.001057 mole) EuS, 0.7367 g. (0.01057 atom) Ca, 1.5853 g. (0.020077 atom) Se, 0.05 g. $I_2$. | Placed in dried graphite crucible which was sealed in evacuated silica tube and heated at 1050° C. for about 48 hours. | 10.605 | 6.405 | 11.17 | 758.7 | Product solidified from the melt as a yellow, polycrystalline solid which fluoresced yellow when exposed to U.V. radiation. The material gave an $EuGa_2S_4$-type Debye-Scherrer pattern. |
| 24 | $Sr_{0.9998}Eu_{0.0002}Ga_2S_4$ | 0.2787 g. (0.00318 atom) Sr, 0.0001 g. (5.43×10$^{-7}$ mole) EuS, 0.4435 g. (0.00636 atom) Ga, 0.4080 g. (0.01272 atom) S, 0.05 g. $I_2$. | Sealed in evacuated silica tube, heated slowly to 1,000° C. and held at 1,000° C. for about 48 hours. | | | | | Light yellow product gave a $SrGa_2S_4$-type X-ray diffraction pattern and fluoresced brightly, emitting yellow-green light. |
| 25 | $Sr_{0.99999}Eu_{0.00001}Ga_2S_4$ | 0.644 g. $SrGa_2S_4$[1] 0.0064 g. of product of Example No. 24. | Reactants were ground together and heated for 2 days at 900° C. in a sealed and evacuated silica tube. | | | | | The product had a pink color typical of undoped $SrGa_2S_4$ and fluoresced only weakly. Spectrographic examination showed the presence of about 2 p.p.m. of Eu. |

See footnotes at end of table.

TABLE III—Continued

| Ex. No. | Product | Reactants | Reaction conditions | Cell constants (A.) and cell volume (A.³) | | | | Remarks |
|---|---|---|---|---|---|---|---|---|
| | | | | a | b | c | V | |
| 26 | $Sr_{0.99998}Eu_{0.00002}Ga_2S_4$ | $SrGa_2S_4$ [1]/$Sr_{0.9998}Eu_{0.0002}Ga_2S_4$ in 10/1 molar ratio. | ...do... | | | | | The white product fluoresced moderately brightly in U.V. light. Thus, Examples No. 24, 25, and 26 show bright fluorescence for (Sr, Eu) $GaS_4$ containing 0.02 atom percent Eu, moderately bright fluorescence at 0.002 atom percent Eu, and weak fluorescence at 0.0002 atom percent Eu. |
| 27 | $Ca_{0.9998}Yb_{0.0002}Ga_2S_4$ | 0.1282 g. (0.0032 atom) Ca, 0.0001 g. (5.8×10⁻⁷ atom) Yb, 0.2066 g. (0.0064 atom) Ga, 0.4104 g. (0.0128 atom) S, 0.05 g. $I_2$. | Reactants were put in an alumina crucible which was heated in a sealed evacuated tube for 3 days at 900° C. | | | | | Pink microcrystalline product gave a $CaGa_2S_4$-type X-ray powder diffraction pattern. It did not fluoresce at 25° C. but when cooled in liquid nitrogen fluoresced brightly (yellow-orange) when exposed to U.V. radiation. |
| 28 | $Sr_{0.9996}Yb_{0.0004}Ga_2S_4$ | 0.1298 g. (0.0015 atom) Sr, 0.0001 g. (5.8×10⁻⁷ atom) Yb, 0.2066 g. (0.0030 atom) Ga, 0.1900 g. (0.0059 atom) S, 0.05 g. $I_2$. | ...do... | | | | | Pinkish-white product gave a $SrGa_2S_4$-type X-ray powder diffraction pattern and weak greenish fluorescence at room temperature in U.V. At liquid nitrogen temperature if fluoresced strongly in the yellow-orange when exposed to U.V. radiation. |

[1] See preparation E.  [2] See preparation A.

TABLE IV
Powder pattern of $EuGa_2S_4$ produced in Example 1

| I | h | k | l | $d_{(obs.)}$ | $d_{(calc.)}$ |
|---|---|---|---|---|---|
| 70 | 1 | 1 | 0 | 5.2347 | 5.2378 |
| 15 | 0 | 0 | 2 | 5.1776 | 5.1787 |
| 15 | 1 | 1 | 1 | 4.6749 | 4.6741 |
| 90 | 1 | 1 | 2 | 3.6828 | 3.6826 |
| 50 | 2 | 0 | 2 | 3.6369 | 3.6373 |
| 15 | 0 | 2 | 0 | 3.0497 | 3.0499 |
| 85 | 3 | 1 | 0 | 2.9727 | 2.9741 |
| 25 | 1 | 1 | 3 | 2.8828 | 2.8826 |
| 40 | 3 | 1 | 1 | 2.8579 | 2.8586 |
| 20 | 2 | 2 | 0 | 2.6192 | 2.6189 |
| 60 | 0 | 0 | 4 | 2.5897 | 2.5893 |
| 5 | 3 | 1 | 2 | 2.5784 | 2.5791 |
| 20 | 4 | 0 | 0 | 2.5543 | 2.5548 |
| 20 | 2 | 2 | 1 | 2.5384 | 2.5390 |
| 100 | 2 | 2 | 2 | 2.3371 | 2.3370 |
| 20 | 1 | 1 | 4 | 2.3210 | 2.3212 |
| 20 | 2 | 0 | 4 | 2.3098 | 2.3097 |
| 40 | 4 | 0 | 2 | 2.2911 | 2.2912 |
| 5 | 2 | 2 | 3 | 2.0864 | 2.0865 |
| 5 | 1 | 3 | 0 | 1.9937 | 1.9942 |
| 25 | 0 | 2 | 4 | 1.9743 | 1.9739 |
| 10 | 1 | 3 | 1 | 1.9575 | 1.9582 |
| 50 | 3 | 1 | 4 | 1.9533 | 1.9529 |
| 5 | 5 | 1 | 0 | 1.9373 | 1.9380 |
| 30 | 1 | 3 | 2 | 1.8614 | 1.8610 |
| 15 | 3 | 3 | 0 | 1.7459 | 1.7459 |
| 25 | 1 | 3 | 3 | 1.7272 | 1.7268 |
| 20 | 3 | 3 | 1 | 1.7219 | 1.7216 |
| 15 | 5 | 1 | 3 | 1.6898 | 1.6899 |
| 15 | 3 | 3 | 2 | 1.6740 | 1.6544 |
| 20 | 1 | 1 | 6 | 1.6399 | 1.6395 |
| 15 | 2 | 0 | 6 | 1.6351 | 1.6354 |
| 10 | 6 | 0 | 2 | 1.6184 | 1.6180 |
| 25 | 4 | 2 | 4 | 1.5624 | 1.5620 |
| 20 | 0 | 4 | 0 | 1.5249 | 1.5249 |
| 15 | 6 | 2 | 0 | 1.4873 | 1.4870 |
| 10 | 2 | 4 | 1 | 1.4472 | 1.4469 |
| 10 | 2 | 2 | 6 | 1.4409 | 1.4413 |
| 10 | 6 | 2 | 2 | 1.4296 | 1.4293 |
| 10 | 5 | 3 | 2 | 1.3886 | 1.3887 |

Note.—I=relative intensity; d=interplanar spacing in A.

TABLE V
Powder pattern of $YbGa_2S_4$ produced in Example 2

| I | h | k | l | $d_{(obs.)}$ | $d_{(calc.)}$ |
|---|---|---|---|---|---|
| 80 | 1 | 1 | 0 | 5.1899 | 5.1922 |
| 15 | 2 | 0 | 0 | 5.0227 | 5.0205 |
| 20 | 1 | 1 | 1 | 4.6128 | 4.6136 |
| 100 | 1 | 1 | 2 | 3.6130 | 3.6121 |
| 70 | 2 | 0 | 2 | 3.5519 | 3.5528 |
| 30 | 0 | 2 | 0 | 3.0324 | 3.0331 |
| 90 | 3 | 1 | 0 | 2.9294 | 2.9305 |
| 55 | 3 | 1 | 1 | 2.8145 | 2.8135 |
| 40 | 2 | 2 | 0 | 2.5959 | 2.5961 |
| 20 | 3 | 1 | 2 | 2.5310 | 2.5319 |
| 85 | 2 | 2 | 1 | 2.5134 | 2.5137 |
| 100 | 2 | 2 | 2 | 2.3068 | 2.3068 |
| 40 | 1 | 1 | 4 | 2.2632 | 2.2628 |
| 65 | 4 | 0 | 2 | 2.2461 | 2.2459 |
| 10 | 2 | 2 | 3 | 2.0527 | 2.0525 |
| 20 | 1 | 3 | 0 | 1.9825 | 1.9828 |
| 5 | 1 | 3 | 1 | 1.9442 | 1.9448 |
| 50 | 0 | 2 | 4 | 1.9353 | 1.9356 |
| 70 | 3 | 1 | 4 | 1.9079 | 1.9081 |
| 15 | 4 | 2 | 1 | 1.8938 | 1.8991 |
| 50 | 1 | 3 | 2 | 1.8442 | 1.8441 |
| 5 | 4 | 2 | 2 | 1.8048 | 1.8049 |
| 40 | 5 | 1 | 2 | 1.7823 | 1.7826 |
| 20 | 3 | 3 | 0 | 1.7307 | 1.7307 |
| 35 | 1 | 3 | 3 | 1.7062 | 1.7063 |
| 15 | 5 | 1 | 3 | 1.6575 | 1.6572 |
| 20 | 3 | 3 | 2 | 1.6367 | 1.6365 |
| 30 | 1 | 1 | 6 | 1.5954 | 1.5951 |
| 30 | 2 | 0 | 6 | 1.5895 | 1.5899 |
| 15 | 1 | 3 | 4 | 1.5567 | 1.5566 |
| 25 | 4 | 2 | 4 | 1.5329 | 1.5328 |
| 20 | 0 | 4 | 0 | 1.5171 | 1.5165 |
| 20 | 6 | 2 | 0 | 1.4653 | 1.4653 |
| 20 | 3 | 3 | 4 | 1.4256 | 1.4256 |
| 15 | 2 | 4 | 2 | 1.3948 | 1.3948 |
| 10 | 5 | 3 | 2 | 1.3707 | 1.3709 |
| 10 | 7 | 1 | 2 | 1.3448 | 1.3451 |
| 5 | 3 | 3 | 5 | 1.3118 | 1.3119 |
| 25 | 4 | 4 | 0 | 1.2981 | 1.2980 |

Reflections not used—

| I | $d_{(obs.)}$ | $q_{(obs.)}$ |
|---|---|---|
| 5 | 12.4582 | .00644 |
| 5 | 5.9305 | .03547 |
| 5 | 3.9305 | .06473 |
| 15 | 3.8894 | .06610 |
| 15 | 3.7568 | .07085 |
| 15 | 3.7424 | .07140 |
| 10 | 3.4137 | .08581 |
| 10 | 3.3691 | .08810 |
| 10 | 3.3118 | .09118 |
| 10 | 3.2723 | .09339 |
| 10 | 3.2066 | .09725 |

Note.—d=interplanar spacing in A.; I=relative intensity; $q=1./d^2$.

TABLE VI
Powder pattern of $EuIn_2S_4$ produced in Example 4

| I | h | k | l | $d_{(obs.)}$ | $d_{(calc.)}$ |
|---|---|---|---|---|---|
| 15 | 1 | 1 | 0 | 5.5305 | 5.5236 |
| 30 | 0 | 0 | 2 | 5.1912 | 5.1803 |
| 10 | 1 | 1 | 1 | 4.8768 | 4.8741 |
| 100 | 1 | 1 | 2 | 3.7768 | 3.7785 |
| 45 | 2 | 0 | 2 | 3.6866 | 3.6857 |
| 20 | 0 | 2 | 0 | 3.2450 | 3.2486 |
| 60 | 3 | 1 | 0 | 3.0789 | 3.0791 |
| 5 | 3 | 1 | 1 | 2.9640 | 2.9515 |
| 10 | 0 | 2 | 2 | 2.7565 | 2.7522 |
| 20 | 2 | 2 | 1 | 2.6741 | 2.6686 |
| 40 | 0 | 0 | 4 | 2.5912 | 2.5901 |
| 100 | 2 | 2 | 2 | 2.4352 | 2.4371 |
| 15 | 1 | 1 | 4 | 2.3441 | 2.3451 |
| 10 | 2 | 2 | 3 | 2.1617 | 2.1569 |

TABLE VI—Continued

| I | h | k | l | d(obs.) | (calc.) |
|---|---|---|---|---------|---------|
| 10 | 1 | 3 | 1 | 2.0787 | 2.0779 |
| 20 | 0 | 2 | 4 | 2.0240 | 2.0252 |
| 40 | 3 | 1 | 4 | 1.9829 | 1.9821 |
| 25 | 1 | 3 | 2 | 1.9629 | 1.9628 |
| 10 | 2 | 2 | 4 | 1.8848 | 1.8893 |
| 10 | 5 | 1 | 2 | 1.8618 | 1.8629 |
| 10 | 3 | 3 | 0 | 1.8387 | 1.8412 |
| 15 | 3 | 3 | 1 | 1.8117 | 1.8128 |
| 10 | 3 | 1 | 3 | 1.7289 | 1.7285 |
| 5 | 1 | 1 | 6 | 1.6449 | 1.6481 |
| 2 | 3 | 3 | 3 | 1.6256 | 1.6247 |
| 2 | 4 | 2 | 4 | 1.6031 | 1.6029 |
| 10 | 3 | 3 | 4 | 1.4996 | 1.5007 |
| 10 | 2 | 2 | 6 | 1.4638 | 1.4641 |
| 10 | 3 | 3 | 5 | 1.3785 | 1.3763 |

Reflections not used—

| I | d(obs.) | q(obs.) |
|---|---------|---------|
| 10 | 4.1568 | .05787 |
| 10 | 3.9316 | .06469 |
| 5 | 3.4636 | .08336 |
| 5 | 3.3119 | .09117 |
| 5 | 1.7755 | .31720 |

NOTE.—d=interplanar spacing in A.; I=relative intensity; q=1./d.²

TABLE VII

Powder pattern of EuGa₂Se₄ produced in Example 5

| I | h | k | l | d(obs.) | d(calc.) |
|---|---|---|---|---------|----------|
| 60 | 1 | 1 | 0 | 5.4649 | 5.4723 |
| 35 | 0 | 0 | 2 | 5.3910 | 5.3973 |
| 10 | 2 | 0 | 0 | 5.3268 | 5.3330 |
| 15 | 1 | 1 | 1 | 4.8775 | 4.8809 |
| 80 | 1 | 1 | 2 | 3.8412 | 3.8427 |
| 15 | 0 | 2 | 0 | 3.1869 | 3.1877 |
| 80 | 3 | 1 | 0 | 3.1043 | 3.1051 |
| 95 | 1 | 1 | 3 | 3.0055 | 3.0065 |
| 95 | 3 | 1 | 1 | 2.9831 | 2.9841 |
| 20 | 0 | 2 | 2 | 2.7431 | 2.7447 |
| 30 | 2 | 2 | 0 | 2.7364 | 2.7361 |
| 60 | 0 | 0 | 4 | 2.6979 | 2.6986 |
| 40 | 4 | 0 | 0 | 2.6658 | 2.6665 |
| 20 | 2 | 2 | 1 | 2.6521 | 2.6523 |
| 100 | 2 | 2 | 2 | 2.4404 | 2.4405 |
| 20 | 1 | 1 | 4 | 2.4202 | 2.4203 |
| 30 | 2 | 0 | 4 | 2.4075 | 2.4079 |
| 50 | 4 | 0 | 2 | 2.3902 | 2.3906 |
| 10 | 2 | 2 | 3 | 2.1782 | 2.1780 |
| 5 | 1 | 3 | 0 | 2.0840 | 2.0842 |
| 10 | 0 | 2 | 4 | 2.0598 | 2.0597 |
| 40 | 3 | 1 | 4 | 2.0371 | 2.0369 |
| 5 | 5 | 1 | 0 | 2.0233 | 2.0229 |
| 2 | 5 | 1 | 1 | 1.9890 | 1.9883 |
| 30 | 1 | 3 | 2 | 1.9448 | 1.9442 |
| 10 | 2 | 2 | 4 | 1.9219 | 1.9214 |
| 5 | 4 | 2 | 2 | 1.9098 | 1.9126 |
| 30 | 5 | 1 | 2 | 1.8943 | 1.8943 |
| 20 | 3 | 3 | 0 | 1.8240 | 1.8241 |
| 60 | 1 | 3 | 3 | 1.8033 | 1.8036 |
| 60 | 0 | 0 | 6 | 1.7992 | 1.7991 |
| 30 | 3 | 1 | 5 | 1.7726 | 1.7725 |
| 45 | 5 | 1 | 3 | 1.7633 | 1.7633 |
| 5 | 3 | 3 | 2 | 1.7284 | 1.7281 |
| 20 | 1 | 1 | 6 | 1.7087 | 1.7091 |
| 20 | 2 | 0 | 6 | 1.7049 | 1.7047 |
| 10 | 6 | 0 | 2 | 1.6885 | 1.6884 |
| 2 | 1 | 3 | 4 | 1.6517 | 1.6495 |
| 30 | 4 | 2 | 4 | 1.6302 | 1.6300 |
| 2 | 5 | 1 | 4 | 1.6189 | 1.6187 |
| 20 | 0 | 4 | 0 | 1.5942 | 1.5938 |
| 15 | 0 | 2 | 6 | 1.5670 | 1.5668 |
| 30 | 6 | 2 | 0 | 1.5527 | 1.5526 |
| 10 | 2 | 4 | 1 | 1.5118 | 1.5121 |
| 5 | 5 | 3 | 0 | 1.5046 | 1.5055 |
| 5 | 5 | 3 | 2 | 1.4498 | 1.4502 |
| 5 | 7 | 1 | 2 | 1.4295 | 1.4291 |
| 20 | 3 | 3 | 5 | 1.3934 | 1.3933 |
| 15 | 5 | 3 | 3 | 1.3894 | 1.3888 |
| 15 | 3 | 1 | 7 | 1.3812 | 1.3811 |
| 15 | 0 | 4 | 4 | 1.3717 | 1.3724 |
| 25 | 4 | 4 | 0 | 1.3682 | 1.3681 |
| 2 | 1 | 3 | 6 | 1.3625 | 1.3619 |

Reflections not used—

| I | d(obs.) | q(obs.) |
|---|---------|---------|
| 10 | 4.0906 | .05976 |
| 5 | 3.9774 | .06321 |
| 5 | 3.5218 | .08062 |
| 5 | 1.8871 | .28082 |
| 5 | 1.8528 | .29130 |

NOTE.—d=interplanar spacing in A.; I=relative intensity; q=1./d.²

TABLE VIII

Powder pattern of EuAl₂S₄ produced in Example 6

| I | h | k | l | d(obs.) | d(calc.) |
|---|---|---|---|---------|----------|
| 80 | 1 | 1 | 0 | 5.2033 | 5.1955 |
| 2 | 1 | 1 | 1 | 4.6525 | 4.6426 |
| 100 | 1 | 1 | 2 | 3.6671 | 3.6652 |
| 55 | 3 | 1 | 0 | 2.9597 | 2.9618 |
| 35 | 3 | 1 | 1 | 2.8586 | 2.8473 |
| 60 | 2 | 2 | 0 | 2.5927 | 2.5978 |
| 20 | 4 | 0 | 0 | 2.5456 | 2.5491 |
| 95 | 2 | 2 | 2 | 2.3208 | 2.3213 |
| 35 | 4 | 0 | 2 | 2.2866 | 2.2864 |
| 20 | 1 | 3 | 0 | 1.9715 | 1.9746 |
| 35 | 3 | 1 | 4 | 1.9487 | 1.9478 |
| 20 | 1 | 3 | 2 | 1.8499 | 1.8447 |
| 20 | 5 | 1 | 2 | 1.8100 | 1.8098 |
| 10 | 3 | 3 | 0 | 1.7338 | 1.7318 |
| 15 | 1 | 3 | 3 | 1.7139 | 1.7135 |
| 30 | 1 | 1 | 6 | 1.6376 | 1.6361 |
| 5 | 6 | 0 | 2 | 1.6149 | 1.6144 |
| 20 | 4 | 2 | 4 | 1.5558 | 1.5557 |
| 5 | 0 | 4 | 0 | 1.5107 | 1.5096 |
| 10 | 6 | 2 | 0 | 1.4808 | 1.4809 |
| 10 | 3 | 3 | 4 | 1.4406 | 1.4389 |
| 5 | 5 | 3 | 2 | 1.3826 | 1.3805 |
| 5 | 7 | 1 | 2 | 1.3645 | 1.3657 |

Reflections not used—

| I | d(obs.) | q(obs.) |
|---|---------|---------|
| 10 | 1.5006 | .44410 |
| 10 | 1.3014 | .59046 |

NOTE.—d=interplanar spacing in A.; I=relative intensity; q=1./d.²

UTILITY

Semiconductivity

As shown in Table III, the resistivity of the products of this invention is between $10^5$ to $10^{11}$ ohm-cm., that is, in a range intermediate between that of good conductors, $10^{-5}$ ohm-cm., and that of insulators, $10^{14}$ to $10^{22}$ ohm-cm. The products show a negative change of resistivity with increase in temperature and are useful components in semiconductor devices such as rectifiers, modulators, detectors, thermistors, photocells, and crystal triodes or transistors.

The temperature dependence of resistivity may be illustrated by that of YbGa₂Se₄ produced as described in Example 4. Resistivity at 298° K was $4 \times 10^5$ ohm-cm. as contrasted to $3 \times 10^4$ ohm-cm. at 370° K. The activation energy, $E_a$, was 0.3 ev. Ytterbium digallium tetraselenide and the various products of the inventino may be used to determine temperature by pre-establishing the relationship of log of resistivity of the material to the reciprocal of absolute temperature and then simply measuring the resistivity of the material and reading its temperature from the temperature-resistivity plot.

EXAMPLE A

Use as a rectifier and as a photovoltaic generator

This example illustrates the use of the novel compositions as semiconductors. Specifically, this example describes the use of a crystal of europium diindium tetraselenide, EuIn₂Se₄, in rectification of electricity and in a photovoltaic cell to convert visible light directly into electricity.

A crystal of EuIn₂Se₄ of flake-like crystal habit and a small piece of gallium were heated in a sealed evacuated silica tube at about 600° C. for 12 hours and then quenched. This vapor phase doping resulted in a superficial coating of the EuIn₂Se₄ with gallium. Whereas the crystal had originally been fluorescent only at very low temperature, it now was fluorescent in visible light at room temperature.

The surface-doped crystal was mounted in rubber cement, leaving only one surface exposed, and the exposed surface was then etched to remove the gallium-continining layer by brief treatment in concentrated hydrochloric acid. The surrounding rubber cement was then removed from the other surfaces. The etched face was no longer fluorescent, although the other faces retained their fluorescence. Electrical contacts were attached to the etched and unetched surfaces using silver paste, and resistance of the crystal was measured by means of a "Senior Volt Ohmyst." The crystal acted as a rectifier, for when the Ga-doped side was negative, the resistance was $200 \times 10^4$ ohm, and when the electrodes were reversed, the resistance was $500 \times 10^4$ ohm.

The etched crystal was also strongly photoconducting. A photovoltage was generated simply by shining light from a microscope lamp directly onto the crystal. The generated voltage was measured by a "Senior Volt-Ohmyst" and found to be about 0.4 volt maximum with actual voltage dependent upon the intensity of the light beam.

Luminescence

The novel compositions disclosed herein are, inter alia, luminophors or luminescent materials and, upon activation by means of appropriate radiation, e.g., ultraviolet or visible light, they luminesce emitting non-thermal radiation in the visible region. The color of luminescence can be controlled by varying the ionic character, i.e., the specific metallic components, of the compositions.

Compositions of this invention exhibit very bright cathodoluminescence as well as photoluminescence. Cathodoluminescence is the luminescence resulting from excitation of a phosphor (fluorophor) by means of cathode rays (beta rays). The property of cathodoluminescence makes the compositions useful in color television and in oscilloscopes.

All compositions of the invention luminesce in the visible wave-length region although the temperature at which they luminesce and the optimum wave length for exciting them varies. Typical compositions of formula $Z_{1-y}Eu_y(Al,Ga)_2(S,Se)_4$ in which Z and y are as defined in the statement of the invention are stimulated by ultraviolet radiation of the wave length shown below, emitting visible light that ranges in color from bluish-green to yellow:

| Composition | Wavelength in A. | |
|---|---|---|
| | Exciting radiation | Emission peak |
| $EuGa_2S_4$ | 2,500–4,000 | 5,420 |
| $EuAl_2S_4$ | 3,000–4,000 | 5,080 |
| $EuGa_2Se_4$ | 3,000–4,000 | 5,280 |
| $Sr_{0.9}Eu_{0.1}Ga_2S_4$ | 3,000–4,000 | 5,330 |
| $Sr_{0.9}Eu_{0.1}Al_2S_4$ | 3,000–4,000 | 4,980 |
| $Ca_{0.9}Eu_{0.1}Ga_2S_4$ | 2,500–2,000 | 5,450 |

Inasmuch as 4000° A. radiation is part of the visible spectrum, it is apparent that the europium-containing compositions may be activated by visible light and more especially by sunlight which has a wave length extending into the UV region. Tests have shown that visible light of 4600° A. is even more efficient than UV light in exciting $EuGa_2S_4$. Europium-containing compositions with high indium content must usually be cooled below room temperature before fluorescence is observed. The luminescence of $Z_{1-y}Eu_y(Al,Ga)_2X_4$ compositions changes from yellow to blue-green as the ionic character of the metallic components increases, i.e., compositions containing calcium and gallium tend to emit in the yellow whereas compositions containing strontium and aluminum tend to emit in the blue-green.

Ytterbium-containing compositions of the invention usually fluoresce with a yellow-orange color. It is frequently necessary to cool the compositions below room temperature to induce strong fluorescence.

F. A. Kröger reports in "Some Aspects of the Luminescence of Solids," Elsevier Publishing Company, Inc., Netherlands, 1948, p. 237 that "As a rule the efficiency of the luminescence as a function of the activator concentration increases at low concentrations but decreases again at higher concentrations, giving a maximum luminescence in an intermediate concentration region." In partial agreement, the luminescence of the products of this invention usually decreases as the y of general formula $$Z_{1-y}M_yQ_2X_4$$

is decreased below 0.01. However, there appears to be little or no decrease in luminescence as y is increased above 0.01 and, in fact, luminescence is observed with y equal to 1 in the compositions $EuGa_2S_4$, $EuGa_2Se_4$, $EuAl_2S_4$ and, when cooled, in $EuIn_2S_4$, $EuIn_2Se_4$, $YbGa_2S_4$, and $YbA_2S_4$. Fluorescence is also observed with

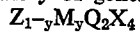

$$Ca_{0.95}Yb_{0.05}Ga_2S_4, \quad Sr_{0.95}Yb_{0.05}Ga_2S_4,$$

and $Sr_{0.95}Yb_{0.05}Ga_2S_2Se_2$.

Luminescence activated by daylight and visible in daylight is fairly common among organic phosphors but is rare among inorganic substances. It is particularly desirable in inorganic luminophors since they should be more efficient, versatile, and durable than organic phosphors.

The luminophors of this invention are useful as luminescent components in various materials and articles such as plastics, displays and paints, as light sources, in a mixture with other phosphors to obtain additive colors, and in general for many of the well-known applications of luminophors.

EXAMPLE B

Use of products of the invention as a source of light was demonstrated by placing vials of $EuGa_2S_4$, $Ca_{0.9}Eu_{0.1}Ga_2S_4$, $Ca_{0.8}Eu_{0.2}Ga_2S_4$, and $EuAl_2S_4$ in turn in a dark box fitted with an ultraviolet lamp. Paper on which a statement had been written was also placed in the dark box. A window at the top permitted inspection of the interior of the box. When the UV lamp was turned on, each of the Eu-containing compositions glowed with such brightness that the viewer was able to read the statement on the paper. Without the luminophors, light from the UV lamp was not sufficient to permit the statement to be read.

EXAMPLE C

This example illustrates the use of the daylight fluorescence of $EuGa_2S_4$ to increase the visibility of a typical plastic. A small amount of $EuGa_2S_4$ was dispersed in styrene monomer and methyl ethyl ketone peroxide catalyst was added to induce polymerization. The resulting polymer fluoresced with a bright yellow color in daylight.

The compositions $EuIn_2Se_4$ and $EuInGaS_4$, and to a lesser extent $EuGa_2Se_4$, are photoconductors and hence useful in a variety of known applications requiring this property. Luminophor-photoconductor junctions can be prepared using, for example, an In-containing composition such as $EuIn_2Se_4$ which is a good photoconductor but not luminescent at room temperature and a Ga- or Al-containing composition such as $EuGaSe_4$ which is luminescent at room temperature. Upon exposure to UV radiation, the emission from the luminophor enhances the photoconductivity of the indium-containing photoconductor.

EXAMPLE D

This example shows the effect of substituting small quantities or dopants into typical products of the invention. The dopants in elemental form were included in typical reaction mixtures which were heated in sealed evacuated tubes in the manner described in Table III. The exact extent of doping is difficult to determine and is not reported, but the shifts in reported fluorescence, in cell dimensions, and/or in resistivity at 298° K. ($\rho$) show that the dopant was actually incorporated:

| Doping element | Element partially replaced | Final composition | Properties of product |
|---|---|---|---|
| None | None | $EuGa_2S_4$ | Bright yellow fluorescence; $\rho=2 \times 10_8$ ohm-cm. |
| Er | (Eu, Yb) | Er-doped (Eu, Yb) $Ga_2S_4$ | Yellow-orange fluorescence. |
| Te | Se | Te-doped $EuGa_2Se_4$ | Orange fluorescence; cell dimensions shifted to slightly larger cell. |
| Cu | Eu | Cu-doped $EuGa_2S_4$ | Yellow fluorescence weaker than that of $EuGa_2S_4$; $\rho=1.1 \times 10^7$ ohm-cm. |
| Cr | Ga | Cr-doped $EuGa_2S_4$ | Feeble yellow fluorescence; $\rho=1.0 \times 10^{10}$ ohm-cm. |
| Ag | Eu | Ag-doped $EuGa_2S_4$ | Bright orange fluorescence; $\rho=7.7 \times 10^7$ ohm-cm. |
| Sm | Eu | Sm-doped $EuGa_2S_4$ | Very weak orange fluorescence; little shift in cell dimensions; $\rho=1.1 \times 10^8$ ohm-cm. |
| Sm | Eu | Sm-doped $EuIn_2S_4$ | Small shift to larger cell dimensions; nonfluorescent at room temperature. |
| Cu | Ga | Cu-doped $EuGaS_4$ | Very little fluorescence. |

EXAMPLE E

Doping of previously grown crystals does not necessarily give the same results as introduction of dopant during synthesis. The dopant may diffuse only part way into the crystal (usually with material lowering in resistivity). Unidentified surface species may be formed which may be responsible for the change in properties. In other cases the dopant may enter uniformly into the crystal lattice. Doping by vapor-phase treatment may, as described in Example A, result in materials useful as rectifiers and in photovoltaic cells. The results of doping typical products of the invention by heating them with various elements and immediately quenching are tabulated below. The positive values of thermoelectric power (microvolts per degree) show that the doped crystal are p-type semiconductors:

| Crystal treated | Dopant(s)/temperature of treatment | Properties of doped crystal | |
|---|---|---|---|
| | | Resistivity $\rho$ in ohm-cm | Thermoelectric power, $\mu v./°$ |
| $EuInSe_4$ | Cu, In, Se/800° C | 1.3 ×10⁵ / 1.5 ×10⁴ | +99 / +35 |
| $EuIn_2Se_4$ | Au, Se/900–600° C | 6.3 ×10⁴ | +5 |
| $EuIn_2Se_4$ | Se/300° C | 9.0 ×10³ | +10 |
| $EuIn_2Se_4$ | Ga/600° C | *2.0 ×10⁴ | +12 |
| $EuIn_2Se_4$ | Al/700° C | 3.5 ×10⁵ | +280 |
| $EuIn_2Se_4$ | Si/600° C | 1.8 ×10⁵ | +18 |
| $EuGa_2S_4$ | Si/800° C | 1.4 ×10⁴ | +0.4 |
| $EuGa_2S_4$ | Ga, Si/600° C | 9.0 ×10³ / 2.5 ×10⁴ | +0.1 / +47 |
| $EuGa_2Se_4$ | Ga, Se/600° C | 1.7 ×10⁴ | +1 |
| $EuGa_2S_4$ | Sn, Ga/900° C | 2.4 ×10⁵ | +35 |
| $EuGa_2Se_4$ | Se/500° C | 2.5 ×10⁶ | +2 |
| $EuGa_2Se_4$ | Si/650° C | 1.6 ×10⁴ | +8 |

*Fluorescent coating.

The embodiments of the invention in which an exclusive property or privilege is claimed are defined as follows:

1. A semiconducting and luminescent composition characterizd by pseudoorthorhombic crystal structure and the formula $$MQ_2X_4$$

wherein:

M is selected from at least one of Eu and Yb,

Q is selected from at least one of Al, Ga and In,

X is selected from at least one of S and Se, and with the proviso that when M consists of or includes Yb, then Q is selected from at least one of Al and Ga.

2. A composition according to claim 1 wherein M is Eu.
3. A composition according to claim 1, $EuGa_2S_4$.
4. A composition according to claim 1, $EuIn_2S_4$.
5. A composition according to claim 1, $EuGa_2Se_4$.
6. A composition according to claim 1 $EuAl_2S_4$.
7. A composition according to claim 1, $EuIn_2Se_4$.
8. A composition according to claim 1, $EuAl_2Se_4$.
9. A composition according to claim 1, $EuGaInS_4$.
10. A composition according to claim 1, $EuGa_2Se_3S$.
11. A composition according to claim 1, wherein M is Yb.
12. A composition according to claim 1 wherein Q is selected from at least one of Al and Ga.
13. A composition according to claim 1, $$Yb_{0.5}Eu_{0.5}Ga_2S_4$$

References Cited

UNITED STATES PATENTS

| 2,814,004 | 11/1957 | Goodman | 23—315 |
| 3,174,939 | 4/1965 | Suchow | 23—315 |
| 3,639,254 | 2/1972 | Peters | 252—301.45 |

OTHER REFERENCES

Bull. Soc. Chim. Fr., (3), 747–50 (1971, March), disclosed in Chemical Abstracts vol. 75, 41422f.

Lotgering, J. Phys. Chem. Solids, vol. 29, p. 699 (1968).

Advanced Inorganic Chemistry, Cotton and Wilkinson, 2nd ed., John Wiley & Sons, Inc., New York (1966), pp. 1070–72.

OSCAR A. VERTIZ, Primary Examiner

J. COOPER, Assistant Examiner

U.S. Cl. X.R.

252—62.3 V, 301.4 S; 423—508, 511